(12) United States Patent
Jiang et al.

(10) Patent No.: US 10,162,130 B2
(45) Date of Patent: Dec. 25, 2018

(54) FLAT OPTICAL FIBER CABLE ASSEMBLY

(71) Applicants: Amphenol Fiber Optic Technology (Shenzhen), Shenzhen, Guangdong Province (CN); Gloriole Electroptic Technology Corp., Kaohsiung (TW)

(72) Inventors: Bo-Lin Jiang, Shenzhen (CN); Song-Sheng Li, Shenzhen (CN); Min Chen, Shenzhen (CN); Chia-Hua Wu, Shenzhen (CN)

(73) Assignees: AMPHENOL FIBER OPTIC TECHNOLOGY (SHENZHEN), Shenzhen, Guangdong Province (CN); GLORIOLE ELECTROPTIC TECHNOLOGY CORP., Kaohsiung (TW)

(*) Notice: Subject to any disclaimer, the term of this patent is extended or adjusted under 35 U.S.C. 154(b) by 0 days.

(21) Appl. No.: 14/964,924

(22) Filed: Dec. 10, 2015

(65) Prior Publication Data
US 2017/0010428 A1    Jan. 12, 2017

(30) Foreign Application Priority Data
Jul. 8, 2015  (TW) .............................. 104211029 U

(51) Int. Cl.
G02B 6/36 (2006.01)
G02B 6/38 (2006.01)
G02B 6/44 (2006.01)

(52) U.S. Cl.
CPC ......... G02B 6/3887 (2013.01); G02B 6/4433 (2013.01); G02B 6/4402 (2013.01)

(58) Field of Classification Search
None
See application file for complete search history.

(56) References Cited

U.S. PATENT DOCUMENTS

| 4,846,545 A * | 7/1989 | Estabrook | G02B 6/4476 385/99 |
| 6,778,743 B1 * | 8/2004 | Kordahi | G02B 6/3889 385/107 |
| 2005/0100303 A1 * | 5/2005 | Cox | G02B 6/3887 385/136 |
| 2007/0110384 A1 * | 5/2007 | Cody et al. | 385/134 |
| 2009/0148103 A1 * | 6/2009 | Lu | G02B 6/3816 385/62 |
| 2010/0086266 A1 * | 4/2010 | Marcouiller | G02B 6/2558 385/99 |

* cited by examiner

Primary Examiner — Chris Chu
(74) Attorney, Agent, or Firm — Muncy, Geissler, Olds & Lowe, P.C.

(57) ABSTRACT

A flat optical fiber cable assembly includes a flat optical fiber cable having an optical fiber cord and at least one tension wire, and a reinforcement mechanism having a reinforcing sleeve sleeved on the at least one tension wire, and a reinforcing body having an outer surface, a through groove indented inwardly from the outer surface, and a positioning groove that is indented inwardly from the outer surface, that is angularly spaced apart from the through groove and that has an engaging portion. The optical fiber cord is inserted into the through groove, and the at least one tension wire is inserted into the positioning groove with the reinforcing sleeve engaging the engaging portion.

3 Claims, 6 Drawing Sheets

FLAT OPTICAL FIBER CABLE ASSEMBLY

CROSS-REFERENCE TO RELATED APPLICATION

This application claims priority to Taiwanese Application No. 104211029, filed on Jul. 8, 2015.

FIELD

The disclosure relates to a fiber cable assembly, and more particularly to a flat optical fiber cable assembly.

BACKGROUND

Referring to FIG. 1, a polymer clad optical fiber cable assembly, as disclosed in Taiwanese Patent No. 387060, includes an optical fiber cable 11, a metal caulked ring 12 press-fitted into the optical fiber cable 11, an end tube 13 covering the metal caulked ring 12, a stop ring 14 connected to the metal caulked ring 12 and the end tube 13, a plastic casing 15 sleeved on and covering the end tube 13, and a tubular sleeve 16 sleeved on a core rod 110 of the optical fiber cable 11 and partially protruding from the plastic casing 15. Usually, by using the metal caulked ring 12 and the stop ring 14, the optical fiber cable 11 can be firmly fixed within the end tube 13.

There are different types of existing optical fiber cables, one of which is a flat optical fiber cable 11' shown in FIG. 2. The flat optical fiber cable 11' has a non-circular cross section. According to FIG. 1, if the metal caulked ring 12 is press-fitted into the flat optical fiber cable 11', the connection force between the metal caulked ring 12 and the flat optical fiber cable 11' may be weak.

SUMMARY

Therefore, an object of the disclosure is to provide a flat optical fiber cable assembly that can alleviate the drawback of the prior art.

According to the disclosure, a flat optical fiber cable assembly includes a flat optical fiber cable and a reinforcement mechanism.

The flat optical fiber cable includes an optical fiber cord, at least one tension wire spaced apart from the optical fiber cord, a plurality of reinforcing fibers and an outer plastic layer covering the optical fiber cord, the at least one tension wire and the reinforcing fibers.

The reinforcement mechanism is connected to the flat optical fiber cable and includes a reinforcing sleeve and a reinforcing body. The reinforcing sleeve is sleeved on the at least one tension wire. The reinforcing body includes two opposite end surfaces, an outer surface extending between the end surfaces, a through groove that is indented inwardly from the outer surface and that extends through the end surfaces, and a positioning groove that is indented inwardly from the outer surface, that extends through the end surfaces and that is angularly spaced apart from the through groove. The positioning groove has an engaging portion. The optical fiber cord is inserted into the through groove, and the at least one tension wire is inserted into the positioning groove with the reinforcing sleeve engaging the engaging portion.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
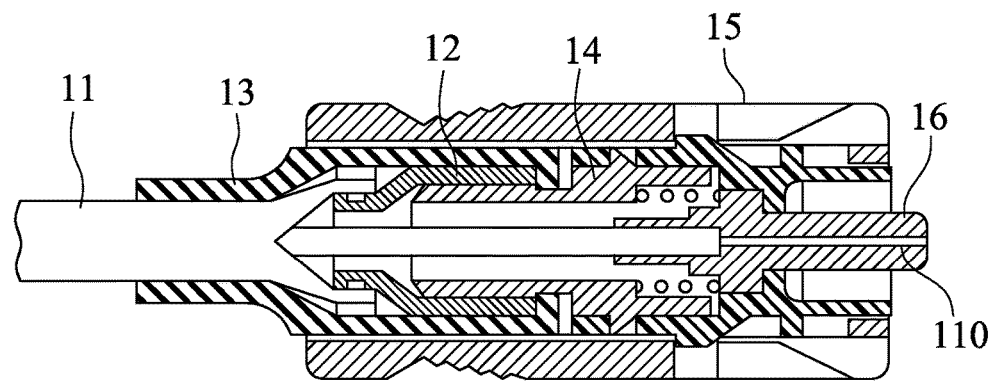
FIG. 1 is a sectional view of an optical fiber cable assembly disclosed in Taiwanese Patent No. 387060.
Figure 2:
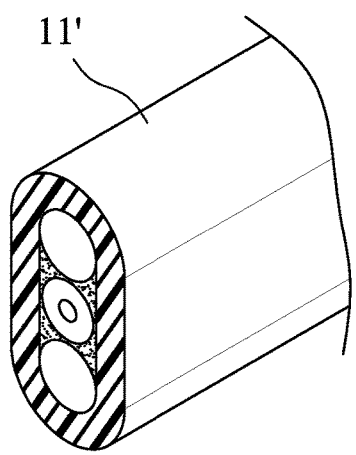
FIG. 2 is a fragmentary perspective view of an existing flat optical fiber cable.

Before the present disclosure is described in greater detail, it should be noted that like elements are denoted by the same reference numerals throughout the disclosure.

Figure 3:
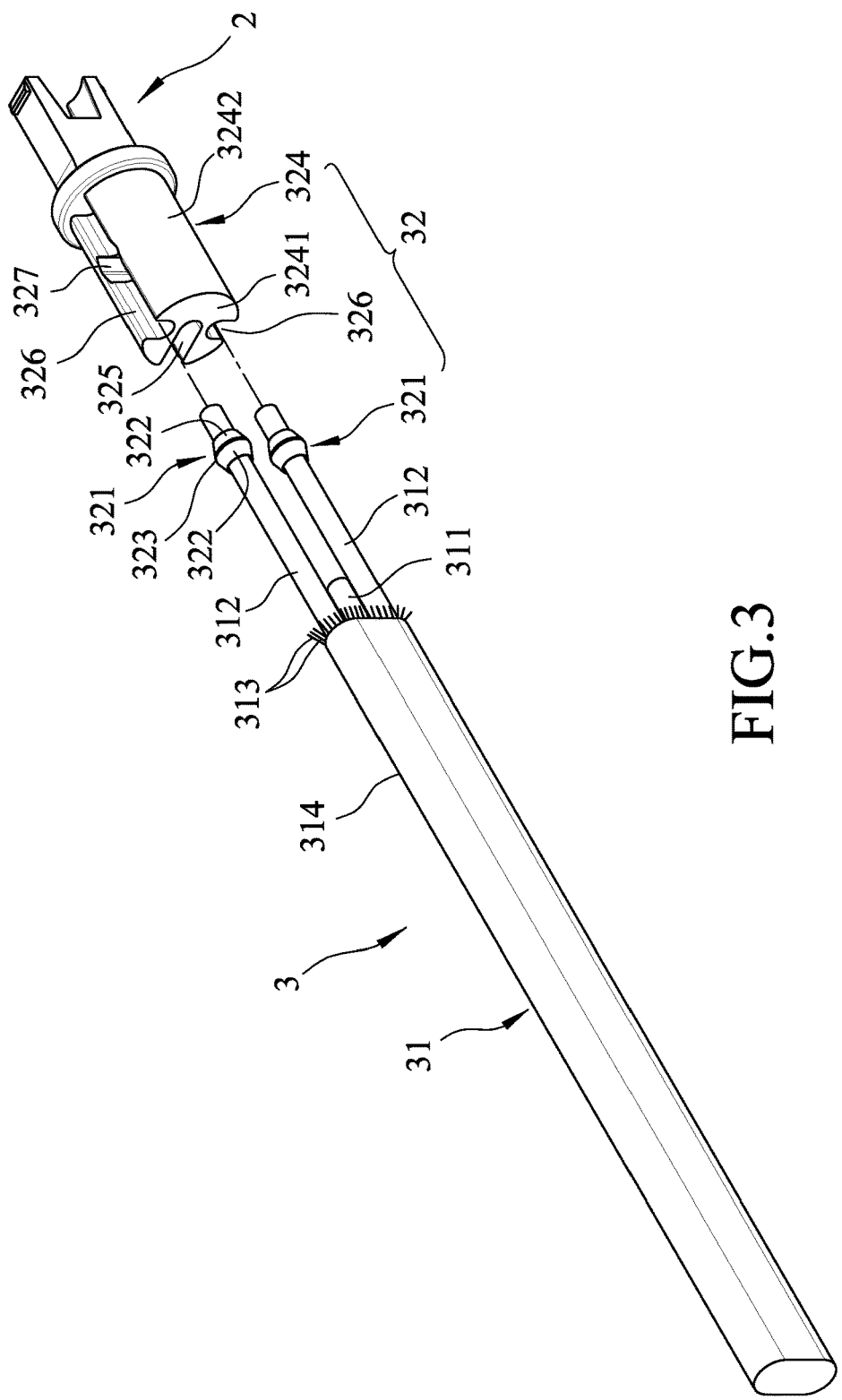
FIG. 3 is an exploded perspective view of an optical fiber cable assembly according to a first embodiment of the disclosure.
Figure 4:
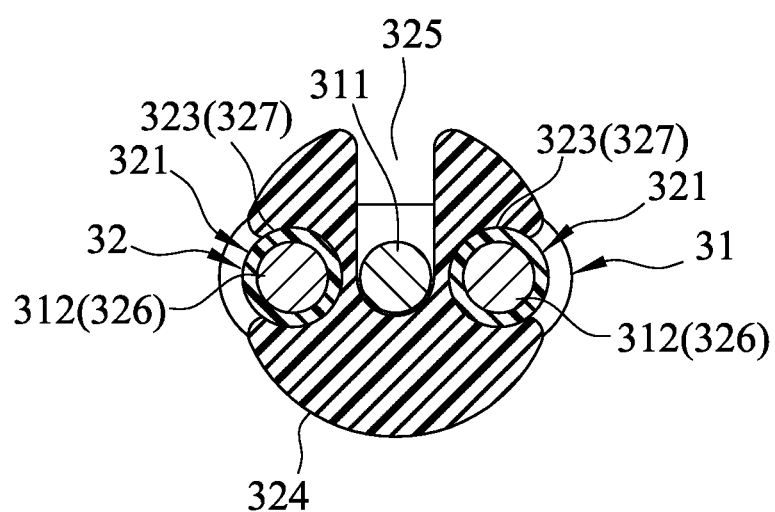
FIG. 4 is an assembled sectional view of the first embodiment.

Referring to FIGS. 3 and 4, an optical fiber cable assembly according to a first embodiment of the disclosure includes a connector 2 and a signal transmitting unit 3 connected to the connector 2.

The signal transmitting unit 3 includes a flat optical fiber cable 31 and a reinforcement mechanism 32 connected to the flat optical fiber cable 31. The flat optical fiber cable 31 includes an optical fiber cord 311, two tension wires 312 spaced apart from each other and from the optical fiber cord 311, a plurality of reinforcing fibers 313 and an outer plastic layer 314 covering the optical fiber cord 311, the two tension wires 312 and the reinforcing fibers 313. In an alternative embodiment, the number of tension wires 312 may be only one. In this embodiment, each reinforcing fiber 313 is a Kevlar fiber.

The reinforcement mechanism 32 includes two reinforcing sleeves 321 respectively sleeved on the tension wires 312, and a reinforcing body 324 coordinated with the reinforcing sleeves 321. In this embodiment, the connector 2 is integrally connected as one piece to one end of the reinforcing body 324, and the reinforcing sleeves 321 are respectively press-fitted on the tension wires 312.

The reinforcing body 324 includes two opposite end surfaces 3241 (only one is visible in FIG. 3), an outer surface 3242 extending between the end surfaces 3241, a through groove 325 that is indented inwardly from the outer surface 3242 and that extends through the end surfaces 3241, and two positioning grooves 326 that are indented inwardly from the outer surface 3242, that extend through the end surfaces 3241 and that are angularly spaced apart from the through groove 325. Each positioning groove 326 has an engaging portion 327. As shown in FIG. 4, the positioning grooves 326 are disposed on two opposite sides of the through groove 325. The optical fiber cord 311 is inserted into the through groove 325, and the tension wires 312 are respectively inserted into the positioning grooves 326 with the reinforcing sleeves 321 engaging the engaging portions 327, respectively.

In this embodiment, each reinforcing sleeve 321 has two opposite side sleeve portions 322 and an intermediate sleeve portion 323 that is disposed between the side sleeve portions 322 and that has an outer diameter larger than that of each of the side sleeve portions 322. The side sleeve portions 322 and the intermediate portion 323 of each reinforcing sleeve 321 are used to engage with the engaging portion 327 of a respective one of the positioning grooves 326. Of course, in actual practice, each reinforcing sleeve 321 may have a uniform outer diameter, and as long as it can engage with the engaging portion 327 of the respective one of the positioning grooves 326, it can achieve the same effect as the aforesaid reinforcing sleeve 321.

Because the reinforcing sleeves 321 are respectively press-fitted on the tension wires 312 and are respectively engaged with the engaging portions 327 of the positioning grooves 326, not only the strength of the connection between the flat optical fiber cable 31 and the reinforcing body 324 can be enhanced, but also the overall structure of the assembly can be simplified, so that the components can be easily assembled, thereby reducing the manufacturing cost of the flat optical fiber cable assembly of the disclosure.

Figure 5:
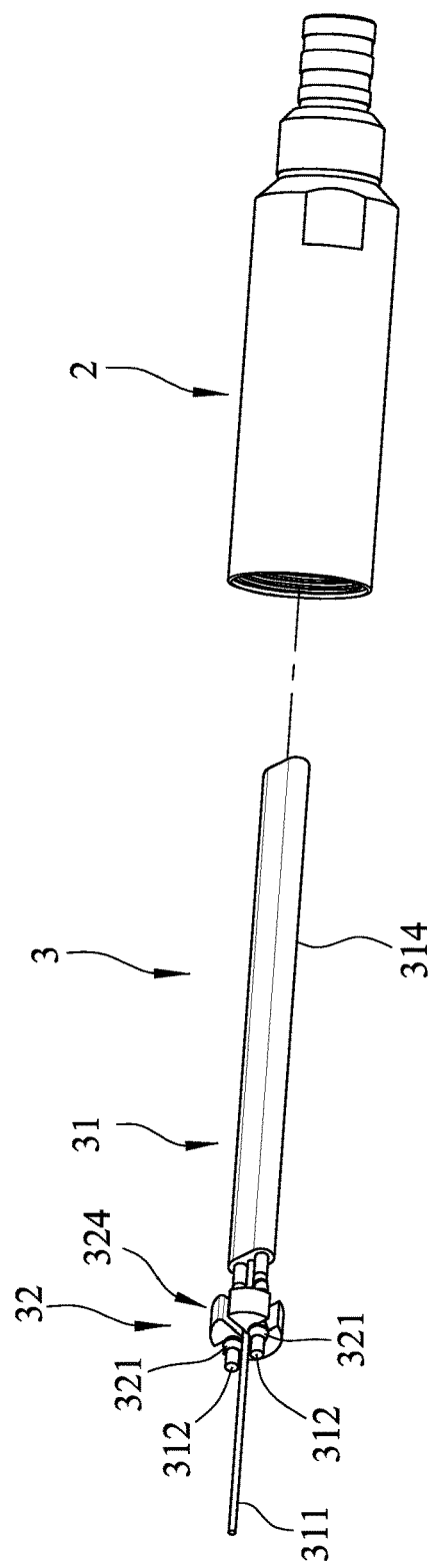
FIG. 5 is an exploded perspective view of an optical fiber cable assembly according to a second embodiment of the disclosure.
Figure 6:
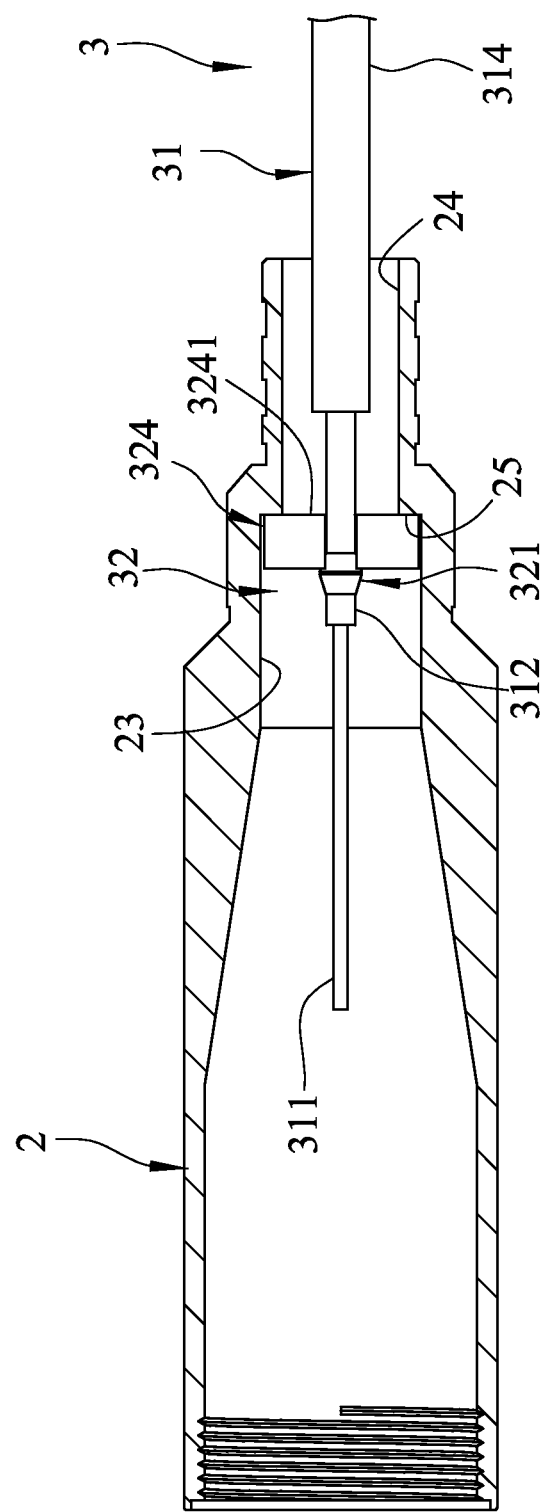
FIG. 6 is a sectional view of the second embodiment in an assembled state.
Figure 7:
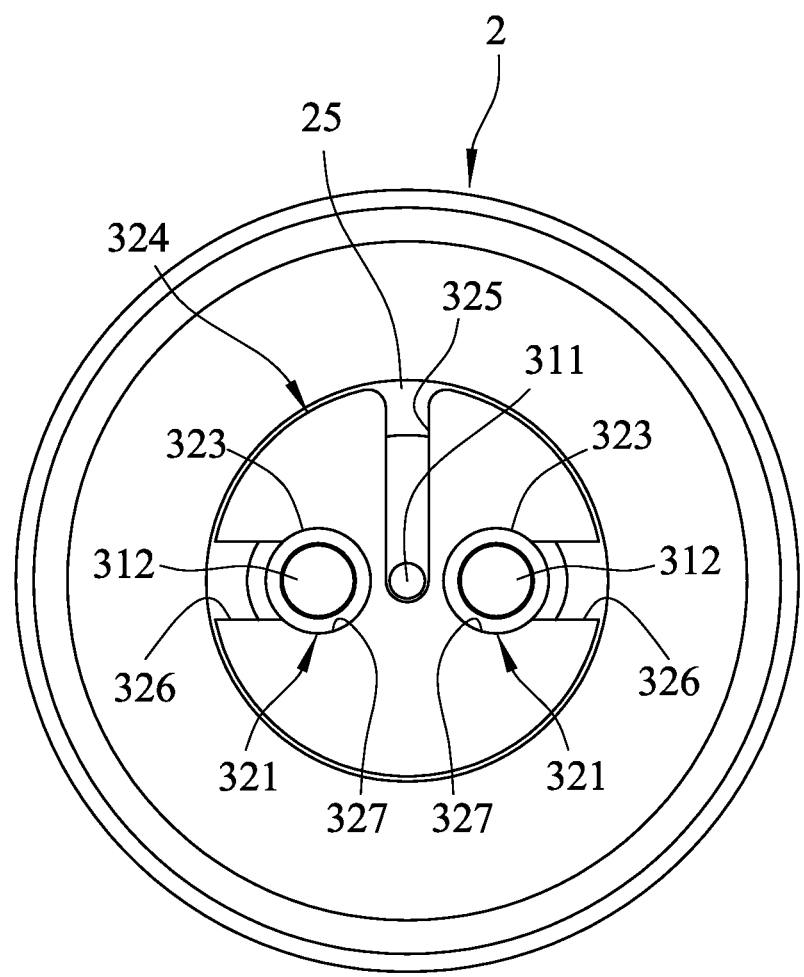
FIG. 7 is a schematic view of the second embodiment.

FIGS. 5 to 7 illustrate a second embodiment of a flat optical fiber cable assembly according to the disclosure which is generally similar to the first embodiment. The difference between the first and second embodiments resides in that the connector 2 and the reinforcing body 324 are separate components. The connector 2 has a first inner diameter portion 23, a second inner diameter portion 24 having a diameter smaller than that of the first inner diameter portion 23, and a shoulder 25 between the first and second inner diameter portions 23, 24. Further, the signal transmitting unit 3 is inserted into the connector 2 such that a portion of the optical fiber cable 31 extends out of one end of the connector 2, and the reinforcing body 324 is press-fitted into the first inner diameter portion 23 with one of the end surfaces 3241 abutting against the shoulder 25.

Aside from achieving the same advantages of the first embodiment, the second embodiment can also permit the connection of the flat optical fiber cable 31 with different types of connectors.

To sum up, with the reinforcing sleeves 321 being respectively press-fitted on the tension wires 312, or with the coordination of the reinforcing sleeves 321 with the structural configurations of the connector 2 and the reinforcing body 324, not only the connection force between the flat optical fiber cable 31 and the connector 2 can be effectively improved, but also the overall structure of the flat optical fiber cable assembly of the disclosure can be simplified so that the components can be easily assembled, thereby reducing the manufacturing cost of the flat optical fiber cable assembly of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A flat optical fiber cable assembly comprising:
    a flat optical fiber cable including an optical fiber cord, two tension wires spaced apart from said optical fiber cord, a plurality of reinforcing fibers and an outer plastic layer covering said optical fiber cord, said tension wires and said reinforcing fibers; and
    a reinforcement mechanism connected to said flat optical fiber cable and including
        two reinforcing sleeves sleeved respectively on said tension wires, and
        a reinforcing body including two opposite end surfaces, an outer surface extending around an axis of said reinforcing body between said end surfaces, a through groove that is indented inwardly from said outer surface and that extends through at least one of said end surfaces, and two positioning grooves each of which is indented inwardly and radially from said outer surface, each of said positioning grooves extending through at least one of said end surfaces and being angularly spaced apart from said through groove, each of said positioning grooves having an engaging portion;
    wherein said optical fiber cord is inserted into said through groove, and said tension wires are respectively inserted into said positioning grooves, and said reinforcing sleeves respectively engaging said engaging portions of said positioning grooves;
    wherein: said positioning grooves respectively have openings that face in two opposite radial directions with respect to the axis of said reinforcing body; said through groove has an opening that faces in a radial direction between said two opposite radial directions;
    wherein said reinforcing sleeve has two opposite side sleeve portions and an intermediate sleeve portion that is disposed between said side sleeve portions and that has an outer diameter larger than that of each of said side sleeve portions, said side sleeve portions and said intermediate portion being, engaged with said engaging portion of said positioning groove;
    wherein said reinforcing sleeve has a bead-shape and a varying diameter that gradually increases from one end of one of said side sleeve portions to said intermediate sleeve portion and gradually decreases from said intermediate sleeve portion to one end of the other one of said side sleeve portions.

2. The flat optical fiber cable assembly as claimed in claim 1, further comprising a connector having a first inner diameter portion, a second inner diameter portion having a diameter smaller than that of said first inner diameter portion, and a shoulder between said first and second inner diameter portions, said reinforcing body abutting against said shoulder.

3. The flat optical fiber cable assembly as claimed in claim 1, further comprising a connector integrally connected as one piece to said reinforcing body.

* * * * *